United States Patent Office 2,901,448
Patented Aug. 25, 1959

2,901,448

RUBBER-RESIN ADHESIVE SOLUTION, PROCESS FOR PREPARATION, AND LAMINATED PRODUCT OBTAINED THEREWITH

Gerard Kraus, Bartlesville, Okla., assignor to Phillips Petroleum Company, a corporation of Delaware No Drawing. Application November 2, 1955
Serial No. 544,588

13 Claims. (Cl. 260—5)

This invention relates to an adhesive composition and to a laminated structure bonded therewith. In one of its aspects, this invention relates to a two phase adhesive composition comprising a continuous phase and a dispersed phase. In another aspect, this invention relates to a laminate comprising a rubber layer bonded to a substantially non-porous material by means of a two phase adhesive composition.

It is known to bond rubber materials, both natural rubber and synthetic rubbers, to non-porous materials such as metals, wood, glass, ceramic materials and the like by means of various adhesive compositions. These adhesive compositions of the prior art frequently form a firm bond to the rubber or to the metal, but not both, and such laminates will pull apart at one of the interfaces. It has frequently been the practice to plate a coat of brass over some metals to avoid weak bonds to metal. Such plating is comparatively costly and requires extremely close control and is very critical in its control. It would, therefore, be advantageous if a simple cement were available which would form both a strong bond to the rubber and to the non-porous material without the use of such a plating operation.

An object of this invention is to provide a new adhesive composition.

Another object of this invention is to provide a laminate firmly bonded together.

Another object of this invention is to provide a two-phase adhesive composition especially suited to bonding a rubber to a non-porous material.

Still another object of this invention is to provide a laminated article comprising a rubber layer and a non-porous material layer.

Still other objects, advantages and features of this invention will be apparent to those skilled in the art having been given this disclosure.

According to this invention, the adhesive composition comprises a continuous rubber phase, and a dispersed resin phase comprising the copolymerized product of a cross-linking compound and a polar monomer, in a solvent for said continuous phase. The laminate of this invention comprises two layers bonded together with said composition.

It is preferred that the resin-rubber be latex masterbatched and then dispersed in a liquid which dissolves the rubber phase. However the resin, rubber and solvent can be mixed together by any suitable means such as by the use of a homogenizing mill. The ratio of resin to rubber is generally in the range of 5 to 50 parts resin to 100 parts rubber and preferably 10 to 25 parts resin per 100 parts rubber.

Such an adhesive composition is useful in bonding two or more solids together and is particularly useful in bonding a rubber to a hard non-porous material. Laminated structures have found many uses in the art and laminated structures of rubber on metal for example, are widely used in commerce. One such use is in rubber lined vessels, etc.

Copolymers of divinyl compounds with such polar monomers as acrylic acid have been used as adhesive in preparing laminates, however, such adhesive forms only a weak bond to rubber. Copolymers of conjugated dienes with polar monomers have also been used as adhesive compositions for bonding rubber to metals. In these compositions, the bond to rubber is accomplished by cross-vulcanization while the bond to the metal arises from the interaction of the polar groups with the metal. In such adhesives the cement to rubber interface often limits the strength of the laminated structure, because it may be difficult to obtain satisfactory simultaneous cures of the cement, the rubber stock and at the interface between cement and rubber.

Adhesion cements for providing an adhesion layer between rubber-like materials, such as natural rubber, polychloroprene, and any of the synthetic rubbers, and non-porous materials, such as metal, for example, steel, iron, ferrous alloys, aluminum and the like often require the use of a brass plate to obtain good adhesion. It is apparent that the addition of a brass plate is costly and the plating operation is very critical in its control factors.

I have found that when a two phase cement is prepared according to the method of this invention, that an adhesive composition is formed which bonds firmly both to rubbers and to hard non-porous materials. While this composition is especially useful in the bonding of rubber to hard non-porous materials, the composition forms a firm bond to both types of material and therefore the cement can be used for bonding rubber to rubber or hard non-porous material to hard non-porous material, e.g. steel to steel, wood to steel, etc.

By rubber, I mean both natural rubbers and synthetic rubbers such as polybutadiene, polychloroprene, or other polymerized conjugated dienes and copolymers of such conjugated dienes with copolymerizable monomers.

As has been said, the rubber phase of the adhesive composition of this invention can be natural rubber or synthetic rubber. Such synthetic rubbers are well known in the art and can be prepared by any method known in the art for the preparation of same. These rubbers are generally prepared by emulsion polymerization, however, rubbers prepared by other methods known to the art such as mass and solvent polymerizations are useful. These rubbers generally are prepared by copolymerizing at least 40 parts of a conjugated diene per 100 parts of monomers. Sufficient conjugated dienes will be used to insure the copolymer being a rubber. While conjugated dienes broadly yield rubbers upon polymerization or copolymerization, 1,3-butadiene, isoprene and chloroprene are the most widely used conjugated dienes in commerce today. These conjugated dienes can be polymerized alone (homopolymers), with each other, or with other copolymerizable monomers. These copolymerizable monomers generally contain a single $CH_2=C=$ group and include such monomers as styrene, vinylnaphthalene, 2-vinylpyridine, 2-methyl-5-vinylpyridine, 3-phenyl-3-butene-1-ol, acrylic acid, methacrylic acid, methyl acrylate, ethyl acrylate, methyl alpha-chloroacrylate, methyl methacrylate, ethyl methacrylate, acrylonitrile, methacrylonitrile, methyl isopropenyl ketone, methyl vinyl ketone, methyl vinyl ether, vinyl acetate, vinyl chloride, vinylidene chloride, vinylfurane vinylcarbazole and the like. Such copolymers and the method of preparing the same are well known in the art and needs no further discussion here.

When the adhesive composition of this invention is to be used for bonding a rubber material to a surface, it is preferred that the rubber phase of the cement be the same as the rubber being bonded so that after setting, or curing, the rubber and cement will be essentially a continuous phase.

The resin phase or dispersed phase comprises a copolymer of at least 5 weight parts per 100 parts of monomers of a cross-linking monomer such as those monomers containing a plurality of vinyl or vinylidene groups and at least 5 weight parts of a highly polar monomer per 100 parts total monomers. Such a resin can also have copolymerized with the cross-linking monomer and the polar monomer other copolymerizable monomers.

Copolymers of 5 to 95 weight parts of the cross-linking monomer and 5 to 50 weight parts of the polar monomer per 100 weight parts of total monomer are frequently preferred as the dispersed resin. In particular, I prefer a copolymer of 5 to 50 weight parts of the polar monomer, 5 to 20 weight parts of the cross-linking monomer and 30 to 90 weight parts of a third copolymerizable monomer per 100 weight parts of total monomers.

The cross-linking monomers are well known in the art and include such monomers as divinylbenzenes, trivinylbenzenes, di(alpha-methylvinyl) benzenes, divinylnaphthalenes, trivinylnaphthalenes, divinyldiphenyls, etc., the foregoing monomers wherein the aromatic ring is further substituted by alkyl or alkenyl groups of 1–12 carbon atoms, and similar pyridines, quinolines and isoquinolines; divinylsulfide; divinyl sulfone; divinyl ether; polyacrylate esters of polyhydric alcohols such as ethylene glycol, propylene glycol, butylene glycol, hexylene glycol, octylene glycol, glycerine, 1,2,4-trihydroxybutane, 1,2,6-trihydroxyhexane, 1,2,3,4-tetrahydroxybutane and similar cross-linking monomers as are known in the art. These compounds can be represented by the general formula:

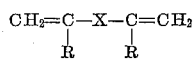

where R is H or CH$_3$ and X is selected from the group consisting of

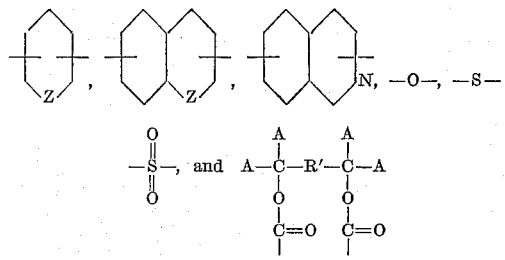

wherein Z is carbon or nitrogen, A is hydrogen, hydroxyalkyl, or an alkyl of 1 to 6 carbon atoms and R' is a carbon to carbon linkage or an alkylene group containing 1 to 8 carbon atoms, which can be further substituted with hydroxy or acryloxy groups and where X is an aromatic or heterocyclic nitrogen radical it can be further substituted with alkyl or alkenyl radicals of up to 12 carbon atoms.

The divinyl aromatic and heterocyclic nitrogen compounds are widely used as cross-linking monomers and I have found them especially useful as the cross-linking monomer and in particular, I prefer divinylbenzene and divinylpyridine as the cross-linking monomer.

The polar monomer is preferably an unsaturated monocarboxylic acid having a carbon to carbon double bond and containing up to 9 carbon atoms. Such acids include acrylic, crotonic, isocrotonic, methacrylic, vinylacetic, sorbic and cinnamic acids. However, other polar monomers can be used such as those monomers containing a carboxyl, hydroxyl, pyridyl, quinolyl or isoquinolyl radical. Examples of such compounds include vinyl and alpha-methylvinyl (isopropenyl) pyridines, quinolines, isoquinolines and alkyl-substituted derivatives thereof wherein the total number of carbon atoms in such nuclear-substituted alkyl groups generally does not exceed 12 and most frequently are methyl and/or ethyl, e.g., 2-vinylpyridine, 3-vinylpyridine, 4-vinylpyridine, 2,4,6-trimethyl-3-vinylpyridine, 3,4,5,6-tetramethyl-2-vinylpyridine, 3-ethyl-5-vinylpyridine, 2-methyl-5-vinylpyridine, 2,6-diethyl-4-vinylpyridine, 2-isopropenyl-4-nonyl-5-vinylpyridine, 2-methyl-5-undecyl-6-vinylpyridine, 3-dodecyl-2,4-divinylpyridine, 2,4-dimethyl-5,6-diphenyl-3-vinylpyridine, 3,5-di(alpha-methylvinyl)pyridine, and similar quinolines and isoquinolines, and hydroxyl containing monomers such as phenylbutenol, allyl alcohol, methallyl alcohol, o-allyl phenol, p-allyl phenol, citronellol (2,6-dimethyl-octene-1-ol-8), and the like.

While any of the above polar monomers are applicable, the unsaturated monocarboxylic acids are preferred and in particular when the material being bonded is a metal since those copolymers of such acids form an extremely firm bond to metals.

The copolymerizable monomers are any of the copolymerizable monomers listed above as being copolymerizable with conjugated dienes as well as the conjugated dienes themselves. The presence of the cross-linking monomers will effect cross-linking of the copolymer to produce a polymeric material which is insoluble in the ordinary hydrocarbon and organic solvents. The preferred copolymerizable monomers are the monovinyl or alpha-methylvinyl aromatic compounds and the conjugated dienes.

The rubber and the resin are mixed by any method known in the art for masterbatching. In the case of synthetic rubber and the resin any method for preparing such polymers or copolymers known to the art can be used. However, when a synthetic rubber is used, it is preferred to prepare the polymeric material by aqueous emulsion polymerization at a temperature generally in the range of 41° F. to 180° F. Any initiator system can be used, such as the iron-pyrophosphate-hydroperoxide recipe, the sulfoxylate recipe, the persulfate recipe and the like. The latices are then mixed and co-coagulated by suitable means such as by alcohol or brine and acid. The co-coagulated crumb is then washed with water and dried.

The masterbatched composition is then incorporated into a solvent in which the continuous or rubber phase, is soluble. Generally the concentration of the resin-rubber masterbatch in the cement will be in the range of 2 to 20 weight percent. However, the solids concentration of the cement can vary over a wide range and will be governed by the ease of application. Obviously a thin cement will require several applications to the surfaces to be bonded while a thick cement will be difficult to apply.

As has been indicated, any solvent for the rubber phase can be used. Such rubber solvents include toluene, chloroform, benzene, carbon tetrachloride, etc. Such solvents are known to the art as is the solubility of various rubbers in various solvents.

Curative or vulcanizing agents are not required when one of the material being bonded is a rubber since those in the rubber would diffuse to and be utilized by the adhesive also. However, it is within the scope of this invention to use such curative agents. Examples of such agents include dicumyl peroxide, cumene hydroperoxide, tertiary-butyl-hydroperoxide, zinc oxide-sulfur accelerator, etc. Where the crumb is to be used for bonding non-rubbers, then the curative agent will be incorporated.

The cement can be applied by roller coating, spraying, dipping, brushing, etc. The parts to be bonded are then brought together and the adhesive cured by the application of heat, generally at a temperature of 250–350° F. In the preparation of a rubber-metal laminate, the adhesive is applied to a clean surface of the metal, the rubber to be bonded thereto is put into place and suitable pressure applied after which the adhesive is cured by the application of heat, e.g. 300° F. for a time sufficient to effect the cure. Usually sufficient temperature is employed to effect the cure in 5 minutes to 5 hours. The pressure can vary over a wide range say from 30 to 1000 pounds per square inch.

I prefer a copolymer of a vinylaromatic monomer, a polyvinyl aromatic monomer and a monocarboxylic unsaturated acid having a terminal double bond as the dispersed phase in my adhesive composition. The rubber phase can be any rubber, however, I prefer to co-coagulate the latices and therefore a synthetic rubber prepared by emulsion polymerization is usually employed as the continuous phase. Styrene is the most widely used vinyl-aromatic monomer, divinylbenzene is widely used as a cross-linking monomer and acrylic acid is a widely used acid monomer. One of the most widely used synthetic rubbers is a copolymer of 1,3-butadiene and styrene (GR–S type rubbers). Therefore, to illustrate this invention, I shall use as my dispersed phase a resin prepared by aqueous emulsion polymerization of styrene, divinylbenzene and acrylic acid and as my continuous phase a rubber prepared by emulsion polymerization of 1,3-butadiene and styrene. However, it should be understood that other resins and rubbers as disclosed are also applicable when utilized in the disclosed ranges and methods.

Two styrene-acrylic acid-divinylbenzene resins were prepared by emulsion polymerization at 122° F. in the recipes of the type shown in Table I.

TABLE I

| Component: | Parts | Parts |
|---|---|---|
| Styrene | 60 | 80 |
| Acrylic Acid | 30 | 10 |
| Divinylbenzene | 10 | 10 |
| Water | 300 | 300 |
| Duponol ME[1] | 10 | 5 |
| Sulfole[2] | 0.1 | 0.08 |
| DIOX D (49.2%)[3] | 1.22 | 1.22 |
| $FeSO_4.7H_2O$ | 0.19 | 0.19 |
| $K_4P_2O_7$ | 0.21 | 0.21 |
| KCl | 0.5 | 0.5 |
| Reaction Conditions: | | |
| Conversion, percent | 93 | 97.1 |
| Time, hours | 18.4 | 15.4 |

[1] Sodium lauryl sulfate.
[2] Tertiary-dodecyl mercaptan.
[3] 49.2% by weight solution of tert-butylisopropylbenzene hydroperoxide in benzene.

These resin latices were then individually coagulated with a 64 Mooney (ML–4) cold rubber which was prepared according to the recipe shown in Table II. The conversion for this 41° F. rubber was 60 percent.

TABLE II

| Component: | Parts |
|---|---|
| Butadiene | 72 |
| Styrene | 28 |
| Water | 180 |
| Santomerse #3[1] | 1.25 |
| KOH | 0.05 |
| Daxad 11[2] | 0.1 |
| $K_4P_2O_7$ | 0.248 |
| $FeSO_4.7H_2O$ | 0.209 |
| Diisopropylbenzene hydroperoxide | 0.160 |
| Sulfole[3] | 0.31 |
| Goodrite 3955[4] | 0.15 |
| Phenyl-β-naphthylamine | 1.5% (based on rubber) |

[1] Alkyl aryl sodium sulfonate.
[2] Sodium salt of alkyl aryl sulfonic acid.
[3] Tertiary-dodecyl mercaptan.
[4] 50/50 mixture of sodium dimethyldithiocarbamate and sulfur in the form of sodium polysulfide.

These resin-rubber masterbatches were co-coagulated in such a manner to give a resin loading of 15 and 22.5 parts per hundred of rubber. After co-coagulation the crumbs were separated by filtration, washed with water, dried, and tested as adhesives according to the procedure of the following examples.

*Example I*

Two and a half grams of the 60/30/10 resin-rubber masterbatch which contained 15 phr. resin were added to a small jar containing 25 cc. of toluene and 0.125 grams of dicumyl peroxide. This mixture was then shaken on a paint shaker for a sufficient time to in- sure homogeneity. Samples of tin plate approximately 1″ x 1″ x 6″ were stripped with concentrated nitric acid, washed thoroughly with water, and dried. The resin-rubber cement was then coated on the stripped tin plate with a brush and allowed to dry. A piece of rubber about 40 mils thick was "sheeted off" a GR–S stock which contained the compounding ingredients shown in Table III.

TABLE III

| Component: | Parts |
|---|---|
| 41 F GR–S | 100 |
| SAF Black[1] | 40 |
| Circo-Para[2] | 4 |
| Zinc oxide | 3 |
| Sulfur | 1.75 |
| Santocure[3] | 1.0 |
| Flexamine[4] | 1.0 |
| Phenyl-β-naphthylamine | 1.0 |

[1] Super-abrasion furnace black.
[2] Circosol-Paraflux blend—a blend of equal parts of Circosol–2XH with Paraflux. Circosol–2XH: a petroleum hydrocarbon softener, containing hydrocarbons of high molecular weight, in the form of heavy, viscous, transparent, pale green, odorless liquid of low viscosity; sp. gr. 0.940; Saybolt Universal viscosity at 100° F., about 2,000 seconds. Paraflux: Saturated polymerized hydrocarbon.
[3] N-cycloxyl-2-benzothiazyl sulfenamide.
[4] A physical mixture containing 65% of a complex diarylamine-ketone reaction product and 35% of N,N'-diphenyl-p-phenylene-diamine.

The surface of the rubber sheet was "freshened" by dipping in *n*-heptane and allowed to dry. Metal-rubber-metal lap joints were then assembled with an overlap of one-inch. This then gave a one square inch bonded area to the laminate. After curing for 30 minutes at 307° F. and a pressure of about 1000 p.s.i. on the bonded area, the sample was placed in a Riehle Brothers testing machine and tested in shear. The shear strength as measured in this test was 150 p.s.i.

*Example II*

Two and a half grams of the 80/10/10 resin-rubber masterbatch which contained 22.5 phr. resin were added to a small jar containing 25 cc. of toluene and 0.125 gram of dicumyl peroxide. The procedure for making the test sample was the same as in Example I. The shear strength as measured in this test was 191 p.s.i.

*Example III*

This sample was made in the same manner as Example I except that natural rubber was used in the laminate. The compounding ingredients with the natural rubber are given in Table IV.

TABLE IV

| Component: | Parts |
|---|---|
| #1 Smoked sheet | 100 |
| EPC black[1] | 40 |
| Zinc oxide | 20 |
| Stearic acid | 3 |
| Sulfur | 2 |
| Santocure[2] | 0.5 |

[1] Easy processing channel black.
[2] N-cyclohexyl-2-benzothiazyl-sulfonamide.

The shear strength for this laminate was 168 p.s.i.

*Example IV*

The resin-rubber masterbatch of Example II was used as the cement in a metal-natural rubber-metal laminate prepared as in Example III. The shear strength obtained with this 80/10/10 resin-rubber cement was 295 p.s.i.

*Example V*

Two and a half grams of the 80/10/10 resin-rubber masterbatch which contained 15 phr. resin were added to a small jar containing 25 cc. of toluene. No dicumyl peroxide was used. The natural rubber of Example III was used to make a metal-rubber-metal laminate as previously described. The shear strength as measured on the Riehle testing machine was 296 p.s.i.

I claim:

1. An adhesive composition comprising a sulfur vulcanizable rubber, selected from the group consisting of natural rubber and a synthetic rubber prepared by polymerizing a conjugated diene, as a continuous phase in solution in an organic solvent for said rubber; and a resin phase dispersed therein, said resin phase consisting of the copolymerized product of at least 5 weight parts of a crosslinking monomer containing a plurality of terminal groups having the formula

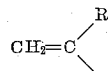

wherein R is selected from the group consisting of H and $CH_3$, and at least 5 weight parts of a copolymerizable unsaturated polar monomer containing a radical selected from the group consisting of hydroxyl, carboxyl, pyridyl, quinolyl and isoquinolyl, said weight parts being weight parts per 100 parts of total monomers copolymerized to form said resin.

2. An adhesive composition comprising a 2 to 20 weight percent solution-dispersion in an organic solvent of (A) 50 to 95 weight parts of sulfur vulcanizable rubber, selected from the group consisting of natural rubber and a synthetic rubber prepared by polymerizing a conjugated diene, in a continuous phase in solution in said solvent and (B) 5 to 50 weight parts of a resin as a dispersed phase in said solution, said resin consisting of the copolymerized product of at least 5 weight parts of a cross-linking monomer containing a plurality of terminal groups having the formula

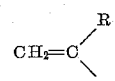

wherein R is selected from the group consisting of H and $CH_3$, and at least 5 weight parts of a copolymerizable unsaturated polar monomer containing a radical selected from the group consisting of hydroxyl, carboxyl, pyridyl, quinolyl and isoquinolyl radicals, said last two mentioned weight parts being based on 100 parts of monomers copolymerized to form said resin.

3. An adhesive composition comprising a 2 to 20 weight percent solution-dispersion in an organic solvent of (A) 50 to 95 weight parts of sulfur vulcanizable rubber, selected from the group consisting of natural rubber and a synthetic rubber prepared by polymerizing a conjugated diene, in a continuous phase in solution in said solvent and (B) 5 to 50 weight parts of a resin dispersed phase in said solution, said resin consisting of the copolymerized product of 5 to 50 weight parts of a crosslinking monomer containing a plurality of terminal groups having the formula

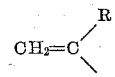

wherein R is selected from the group consisting of H and $CH_3$, and 5 to 95 weight parts of a copolymerizable unsaturated polar monomer containing a radical selected from the group consisting of hydroxyl, carboxyl, pyridyl, quinolyl, and isoquinolyl radicals, said last two mentioned weight parts being based on 100 parts of monomers copolymerized to form said resin.

4. The composition of claim 3 wherein the rubber in said continuous phase is a 1,3-butadiene/styrene copolymer, the cross-linking monomer is a divinyl aromatic monomer, the polar monomer is an unsaturated monocarboxylic acid containing a terminal carbon to carbon double bond and containing not more than 9 carbon atoms, and the solvent is toluene.

5. The composition of claim 4 wherein the cross-linking monomer is divinylbenzene and the polar monomer is acrylic acid.

6. The composition of claim 4 wherein the cross-linking monomer is divinylbenzene and the polar monomer is 2-methyl-5-vinylpyridine.

7. The composition of claim 4 wherein the composition comprises a sulfur containing vulcanizing agent.

8. The composition of claim 7 wherein said vulcanizing agent is dicumyl peroxide.

9. A method of preparing an adhesive composition comprising mixing an aqueous emulsion of synthetic rubber latex of a sulfur vulcanizable rubber, selected from the group consisting of natural rubber and synthetic rubber prepared by polymerizing a conjugated diene, with an aqueous emulsion latex of a resin copolymer in a ratio to provide 50 to 95 weight parts of said rubber and 5 to 50 weight parts of said resin per 100 parts of rubber plus resin; co-coagulating the rubber and resin from the mixed latices; and incorporating 2 to 20 weight parts of the coagulum into 98 to 80 parts of an organic solvent for said rubber so as to form a continuous rubber-in-solvent phase and a dispersed resin phase; said aqueous emulsion latex of said resin having been prepared by copolymerizing in aqueous medium 5 to 50 weight parts of a cross-linking monomer containing a plurality of terminal groups having the formula

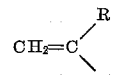

wherein R is selected from the group consisting of H and $CH_3$ with 5 to 95 weight parts of a copolymerizable unsaturated polar monomer containing a radical selected from the group consisting of hydroxyl, carboxyl, pyridyl, quinolyl and isoquinolyl radicals, said last two mentioned weight parts being based on 100 parts of monomers copolymerized to form said resin.

10. The process of claim 9 wherein the rubber latex is prepared by aqueous emulsion copolymerizing 1,3-butadiene and styrene and the resin copolymer is a copolymer of styrene, divinylbenzene and acrylic acid, and the solvent is toluene.

11. A laminated article comprising a solid material bonded to a solid material, said solid materials being solid at the temperature of bonding, by an adhesive comprised of 50 to 95 weight parts of a sulfur vulcanizable rubber, selected from the group consisting of natural rubber and synthetic rubber prepared by polymerizing a conjugated diene, as a continuous phase, and 5 to 50 weight parts of a resin as a dispersed phase in said rubber; said resin phase being a copolymer of 5 to 50 weight parts per 100 parts of monomers of a cross-linking monomer containing a plurality of terminal groups having the formula

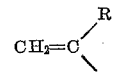

wherein R is selected from the group consisting of H and $CH_3$, with 5 to 95 weight parts of a copolymerizable unsaturated polar monomer containing a radical selected from the group consisting of hydroxyl, carboxyl, pyridyl, quinolyl and isoquinolyl radicals, said last two mentioned weight parts being based on 100 parts of monomers copolymerized to form said resin, said adhesive composition being cured by the application of heat.

12. A laminated article comprising a hard, non-porous material, solid at the temperature of bonding, bonded to a rubber by an adhesive comprised of 50 to 95 weight parts of a sulfur vulcanizable rubber, selected from the group consisting of natural rubber and synthetic rubber prepared by polymerizing a conjugated diene, as a continuous phase, and 5 to 50 weight parts of a resin as a dispersed phase in said rubber, said resin being a copolymer of 5 to 50 weight parts per 100 parts of monomers of a cross-linking monomer containing a plurality of terminal groups having the formula

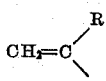

wherein R is selected from the group consisting of H and $CH_3$, with 5 to 95 weight parts of a copolymerizable unsaturated polar monomer containing a radical selected from the group consisting of hydroxyl, carboxyl, pyridyl, quinolyl and isoquinolyl radicals, said last two mentioned weight parts being based on 100 parts of monomers copolymerized to form said resin, said adhesive composition being cured by the application of heat.

13. The laminated article of claim 12 wherein the rubber and the continuous rubber phase of the adhesive are each a copolymer of 1,3-butadiene and styrene, and the resin phase is a copolymer 5 to 50 weight parts of acrylic acid, 5 to 20 parts of divinylbenzene and styrene.

References Cited in the file of this patent

UNITED STATES PATENTS

| | | |
|---|---|---|
| 2,340,111 | D'Alelio | Jan. 25, 1944 |
| 2,647,843 | Bemmels | Aug. 4, 1953 |
| 2,681,320 | Bodamer | June 15, 1954 |